United States Patent
Bonas

(10) Patent No.: US 11,080,174 B2
(45) Date of Patent: Aug. 3, 2021

(54) DETECTING AND HANDLING DISCREPANCIES BETWEEN EXTERNAL CIRCUIT BREAKERS AND INTERNAL CIRCUIT BREAKERS

(71) Applicant: Red Hat, Inc., Raleigh, NC (US)

(72) Inventor: Alissa Bonas, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 9 days.

(21) Appl. No.: 16/400,662

(22) Filed: May 1, 2019

(65) Prior Publication Data
US 2020/0349061 A1 Nov. 5, 2020

(51) Int. Cl.
| | |
|---|---|
| G06F 11/36 | (2006.01) |
| H04L 29/08 | (2006.01) |
| H04L 12/24 | (2006.01) |
| H04L 12/721 | (2013.01) |
| H04L 12/771 | (2013.01) |
| H04L 12/26 | (2006.01) |

(52) U.S. Cl.
CPC ...... *G06F 11/3688* (2013.01); *G06F 11/3604* (2013.01); *G06F 11/3684* (2013.01); *H04L 41/5038* (2013.01); *H04L 43/08* (2013.01); *H04L 43/0811* (2013.01); *H04L 45/44* (2013.01); *H04L 45/56* (2013.01); *H04L 45/566* (2013.01); *H04L 45/70* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 9,842,045 B2 | 12/2017 | Heorhiadi et al. | |
| 10,102,111 B2 | 10/2018 | Rajagopalan et al. | |
| 10,116,499 B2 | 10/2018 | Kumar et al. | |
| 2009/0132543 A1* | 5/2009 | Chatley | G06F 3/067 |
| 2014/0181800 A1* | 6/2014 | Johansson | G06F 8/656 |
| | | | 717/172 |

(Continued)

FOREIGN PATENT DOCUMENTS

WO 2017127225 A1 7/2017

OTHER PUBLICATIONS

"Circuit Breaking", Istio, Traffic Management, Jul. 27, 2018, 4 pages.

(Continued)

*Primary Examiner* — Lewis A Bullock, Jr.
*Assistant Examiner* — Mark A Gooray
(74) *Attorney, Agent, or Firm* — Lowenstein Sandler LLP

(57) ABSTRACT

Aspects of the disclosure provide for mechanisms for detecting and handling discrepancies between an external circuit breaker and an internal circuit breaker applicable to applications and/or services in a computer system. A method of the disclosure includes: determining, in view of a first circuit breaker applicable to a service hosted on a computer system, a first circuit breaking rule, wherein the first circuit breaker is applicable to one or more endpoints of the computer system; determining, in view of a second circuit breaker applicable to the service, a second circuit breaking rule; and generating a warning in response to detecting a discrepancy between the first circuit breaking rule and the second circuit breaking rule.

19 Claims, 4 Drawing Sheets

(56) References Cited

U.S. PATENT DOCUMENTS

2019/0387049 A1\* 12/2019 Patil ........................ H04L 12/66

OTHER PUBLICATIONS

Don Schenck, "Istio Circuit Breaker: When Failure Is an Option", Red Hat Developer, Blog Articles, Mar. 27, 2018, 11 pages.
Matt Jacobs, "How it Works—Netflix/Hystrix", Wiki—GitHub, Jul. 4, 2017, 18 pages.

\* cited by examiner

US 11,080,174 B2

DETECTING AND HANDLING DISCREPANCIES BETWEEN EXTERNAL CIRCUIT BREAKERS AND INTERNAL CIRCUIT BREAKERS

TECHNICAL FIELD

The implementations of the disclosure relate generally to computer systems and, more specifically, to detecting discrepancies between external circuit breakers applicable to an application and/or service and internal circuit breakers applicable to the application and/or service.

BACKGROUND

Circuit breaking is a design pattern in software development that can be used to detect failures related to an application and prevent the failures from constantly recurring. For example, a software circuit breaker can monitor operations of the application for failures. Once the number of failures reaches a certain threshold, the software circuit breaker may be "tripped" and all further calls to the application may return with an error or other type of alert. Circuit breaking is an important pattern for creating resilient applications and may enable execution of applications that limit the impact of failures, latency spikes, and other undesirable effects of network peculiarities.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
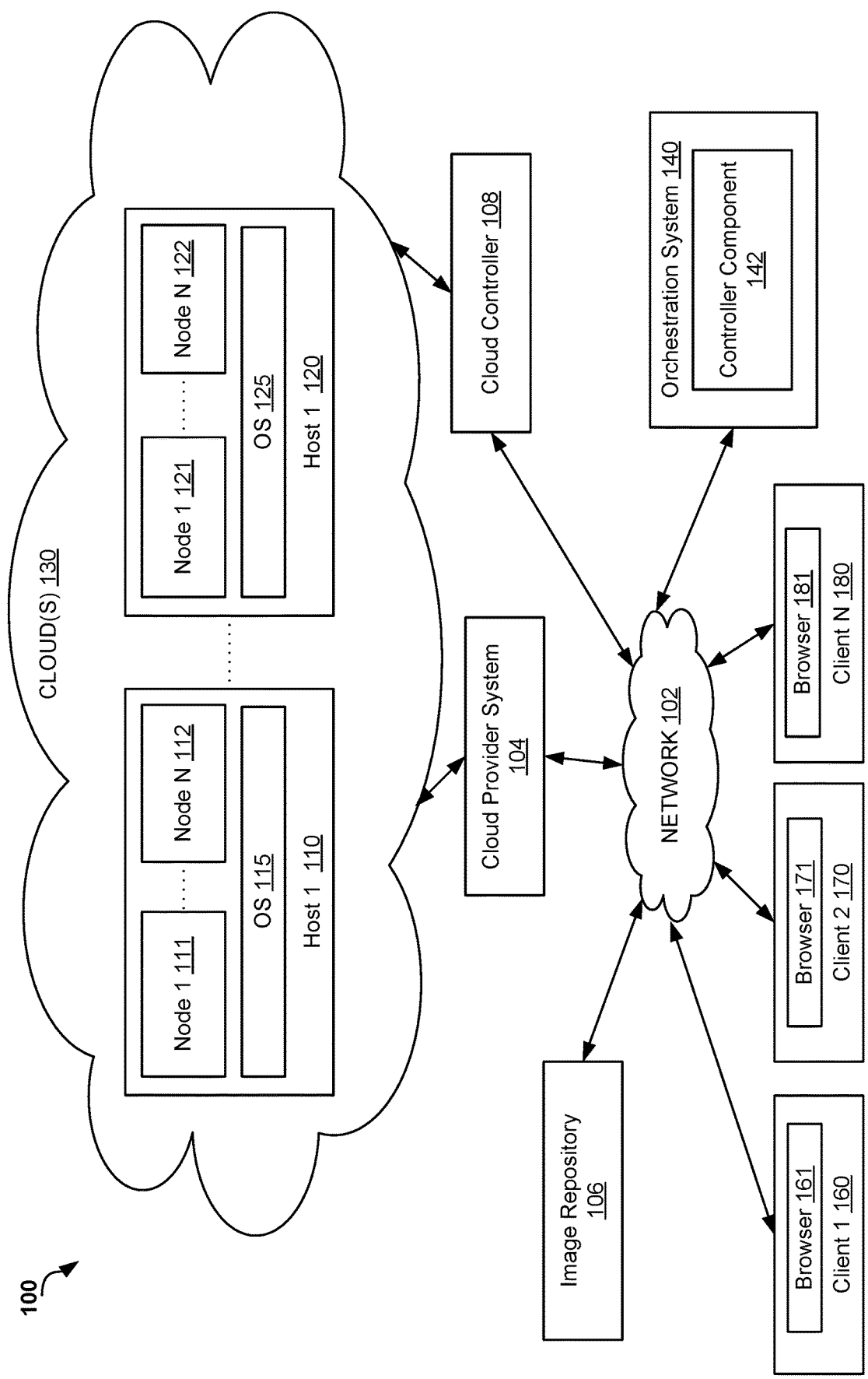
FIG. 1 is a block diagram of a network architecture in which implementations of the disclosure may operate.

Circuit breaking is a design pattern in software development that can be used to detect failures related to an application and prevent the failures from constantly recurring. A computer system (e.g., a cloud-based system) may implement a circuit breaker for an application and/or services hosted by the computer system by applying configurations external to source code of the application and/or service (also referred to as the "external circuit breaker"). The external circuit breaker may thus be configured without modifying the source code of the application and/or service. Meanwhile, the source code of the application and/or service may also provide a circuit breaker applicable to the application and/or service (also referred to as the "internal circuit breaker"). There might be a discrepancy between the external circuit breaker and the internal circuit breaker. For example, the external circuit breaker may provide that the maximum number of concurrent connections to the application and/or service is 10 while the internal circuit breaker may provide that the maximum number of concurrent connections to the application and/or service is 5. Such discrepancy might cause unpredictable application behavior and may mislead troubleshooting of the application and/or service.

Aspects of the disclosure provide for mechanisms (e.g., methods, systems, computer-readable medium) for detecting and handling discrepancies between external circuit breakers and internal circuit breakers applicable to application and services. For example, the mechanisms may determine one or more circuit breaking rules that are implemented by an external circuit breaker applicable to an application and/or service (e.g., one or more rules defining triggers of the external circuit breaker). The mechanisms may also determine one or more circuit breaking rules implemented by an internal circuit breaker applicable to the application and/or (e.g., one or more rules defining triggers of the internal circuit breaker). The mechanisms may then determine discrepancies between the external circuit breaker and the internal circuit breaker in view of the determined circuit breaking rules. For example, the mechanisms may determine that the external circuit breaker implements a first circuit breaking rule that provides a first threshold number of connections to the application and/or service (e.g., a first maximum number of concurrent connections to the application and/or service). The mechanisms may also determine that the internal circuit breaker implements a second circuit breaking rule that provides a second threshold number of connections to the application and/or service (e.g., a second maximum number of concurrent connections to the application and/or service). The mechanisms may detect a discrepancy between the external circuit breaker and the internal circuit breaker in response to determining that the first circuit breaking rule is different from the second circuit breaking rule (e.g., that the first threshold number is different from the second threshold number).

In some embodiments, the mechanisms may generate an alert in response to detecting the discrepancy between the external circuit breaker and the internal circuit breaker. The alert may include one or more messages indicating the detected discrepancy between the external circuit breaker and the internal circuit breaker and/or the discrepancy between the first circuit breaking rule and the second circuit breaking rule. The mechanisms may also provide the alert to a user (e.g., an administrator of the system).

Accordingly, the mechanisms provided herein may unify configurations of applications and/or services hosted by a computer system (e.g., a cloud-based system) and may alert users of discrepancies between external circuit breakers provided by configurations external to source code of applications and internal circuit breaking rules provided by source code of the application. As such, the mechanisms may alert users of issues that may cause unexpected application behavior, resulting in enhanced accuracy of software troubleshooting.

FIG. 1 is a block diagram of a network architecture 100 in which implementations of the disclosure may operate. In some implementations, the network architecture 100 may be used in a Platform-as-a-Service (PaaS) system, such as OpenShift®, Kubernetes. The PaaS system provides resources and services for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems.

As shown in FIG. 1, the network architecture 100 may include a cloud-computing environment 130 (also referred to herein as a cloud) that includes nodes 111, 112, 121, 122 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. In some implementations, the host machines 110, 120 are often located in a data center. For example, nodes 111 and 112 are hosted on physical machine 110 in cloud 130 provided by cloud provider 104. In some implementations, an environment other than a VM may be used to execute functionality of the PaaS applications. When nodes 111, 112, 121, 122 are implemented as VMs, they may be executed by operating systems (OSs) 115, 125 on each host machine 110, 120.

In some implementations, the host machines 110, 120 may be located in a data center. Users can interact with applications executing on the cloud-based nodes 111, 112, 121, 122 using client computer systems, such as clients 160, 170, and 180, via corresponding web browser applications 161, 171, and 181. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in cloud(s) 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121, 122. This data may be used for the execution of applications for a multi-tenant PaaS system managed by the PaaS provider controller 140.

In one implementation, the data associated with the application may include data used for execution of one or more containers that include application images built from pre-existing application components and source code of users managing the application. As used herein, an image may refer to data representing executables and files of the application used to deploy functionality for a runtime instance of the application. In one implementation, the image can be built using suitable containerization technologies (e.g., using a Docker™ tool).

In some embodiments, each of nodes 111, 112, 121, 122 can host one or more containers. Each of the containers may be a secure process space on the nodes 111, 112, 121 and 122 to execute functionality of an application and/or a service. In some implementations, a container is established at the nodes 111, 112, 121 and 122 with access to certain resources of the underlying node, including memory, storage, etc. In one implementation, the containers may be established using the Linux Containers (LXC) method, cgroups, SELinux™, and kernel namespaces, etc. A container may serve as an interface between a host machine and a software application. The software application may comprise one or more related processes and may provide a certain service (e.g., an HTTP server, a database server, etc.). Containerization is an operating-system-level virtualization environment of a host machine that provides a way to isolate service processes (e.g., micro-service processes). At the same time, employing the containers makes it possible to develop and deploy new cloud-based micro-services in a cloud-based system.

Each of nodes 111, 112, 121, 122 can host one or more applications and/or services. Each of the services may correspond to an application and/or one or more components of the application and may provide one or more functionalities of the application. Examples of the services may include a web server, a database server, a middleware server, etc. Each of the services may run as an independent process in a suitable machine (e.g., a container, a virtual machine, a physical machine, etc.). A service running in system 100 may communicate with one or more other services in system 100. In one implementation, an application may be deployed as one or more services on one or more nodes 111, 112, 121, 122. Each of the services may be deployed in one or more containers. In some implementations, a service may be an application.

In some embodiments, an application may be deployed as a plurality of services (e.g., micro-services) on one or more of the nodes. Each of the services may be hosted by one or more containers. More particularly, for example, multiple replicas of a service may be host by a plurality of containers running on one or more nodes. Each of the replicas may represent an instance of the service and may provide the same functionality of the service.

A micro-service may be an independently-deployable modular service that may communicate with other services in a system (e.g., a cloud-based system) through a lightweight interface. The code of the software application may be stored along with micro-services in containers to create containerized applications. The containerized application may be released as software product that can be executed as a self-contained application on nodes in a cloud. Each of the nodes (e.g., a host computer, a virtual machine, etc.) may support a container execution environment (e.g., a Docker™ environment). Employing such micro-services allows breaking down complex applications into relatively simple independent processes, thus producing highly decoupled systems. Each system may include multiple applications that are hosted on a provider's infrastructure. Each process associated with the services is focusing on doing a relatively simple task to support the applications for each individual customer.

Orchestration system 140 may provide management and orchestration functions for deploying and/or managing applications and/or services of system 100. For example, orchestration system 140 can build one or more container images for providing functionality of the applications and/or the services. The orchestration system 140 can then create one or more containers to host the application and/or service (e.g., by instructing one or more nodes 111, 112, 121, 122 to instantiate one or more containers from the container image(s)). Orchestration system 140 can include one or more computing devices (e.g., a computing device as shown in FIG. 5). Orchestration system 140 can implement an application programming interface to facilitate deployment, scaling, and/or management of containerized software applications.

In some embodiments, orchestration system 140 can deploy an application as one or more services on one or more nodes. Each of the services may be deployed in one or more containers. In some embodiments, a replica of the service may be created by deploying one or more containers on a node.

As shown in FIG. 1, the orchestration system 140 may include a controller component 142 that can perform traffic management and other functions for applications and/or services hosted by nodes 111, 112, 121, 122. For example, the controller component 142 may enable a user to specify rules to be used to route traffic for the applications and/or services. The controller component 142 may also configure failure recovery features, such as timeouts, retires, and circuit breakers.

In some embodiments, the controller component 142 may provide circuit-breaking functionality at a network-level. For example, the controller component 142 may configure a circuit breaker that applies to one or more endpoints of system 100 (also referred to as the "external circuit breaker"). Each of the endpoints may be and/or include one or more containers, pods, VMs, nodes, etc. that can host one or more applications and/or services. In some embodiments, the endpoints may host a plurality of applications and/or services. The external circuit breaker may thus also be applicable to the applications and/or services hosted by the endpoints.

The external circuit breaker may be configured in view of one or more circuit breaking rules specifying events that may trigger the external circuit breaker (also referred to as the "first circuit breaking rules"). The satisfaction of one or more of the first circuit breaking rules may trigger the external circuit breaker. Examples of the first circuit breaking rules may include a threshold number of connections (e.g., the maximum number of concurrent connections) to the endpoints and/or the applications/services, a threshold number of requests (e.g., the maximum number of requests) that can be handled by a connection to the endpoints and/or the applications/services, etc.

In some embodiments, the external circuit breaker may be configured in view of one or more configuration files including the first circuit breaking rules. In one implementation, one or more configuration files and/or the first circuit breaking rules may be provided by a user. In another implementation, one or more of the configuration files and/or the first circuit breaking rules may be determined by the controller component 142 (e.g., in view of functions to be provided by the applications/services). The configuration files may be independent of source code of the applications and/or service hosted by the endpoints and may be modified without modifying the source code of the applications and/or services. As such, the external circuit breaker may be configured without changing the source code of the applications and/or services hosted by the endpoints.

When the external circuit breaker is triggered, the controller component 142 may apply one or more traffic policies (e.g., routing rules, load balancing rules) to the endpoints and/or the application/services hosted by the endpoints. For example, the controller component 142 may cause one or more portions of traffic destined to the endpoints (e.g., requests, data, etc.) not to be routed to the endpoints. In some embodiments, the controller component 142 may direct the traffic destined to the endpoints to one or more other endpoints of system 100. The controller component 142 may also generate one or more error messages and transmit the error messages to a user device that sent the traffic.

While the external circuit breaker may be applicable to an application and/or service that hosted by one or more of the endpoints as described above, a circuit breaker of the application and/or service (also referred to as the "internal circuit breaker") may also be applicable to the same application and/or service. The internal circuit breaker may be defined by source code of the application and/or service and/or a configuration file related to the source code of the application and/or service (e.g., a configuration file referred to by the source code). The internal circuit breaker may implement one or more circuit breaking rules specifying events that may trigger the internal circuit breaker (also referred to as the "second circuit breaking rules"). The satisfaction of one or more of the second circuit breaking rules may trigger the internal circuit breaker. Examples of the second circuit breaking rules may include a threshold number of connections (e.g., the maximum number of concurrent connections) to the application and/or service, a threshold number of requests (e.g., the maximum number of requests) that can be handled by a connection to the application and/or service, etc.

In some embodiments, the controller component 142 may also detect and/or handle discrepancies between the external circuit breaker and the internal circuit breaker. For example, the controller component 142 may determine respective circuit breaking rules related to the external circuit breaker and the internal circuit breaker. For example, the controller component 142 may determine a first circuit breaking rule related to the external circuit breaker defining a first threshold number of connections to the application and/or service (e.g., a first maximum number of concurrent connections to the application and/or service). The controller component 142 may also determine a second circuit breaking rule related to the internal circuit breaker defining a second maximum number of connections to the application and/or service (e.g., a second maximum number of concurrent connections to the application and/or service). The controller component 142 may further determine that there is a discrepancy between the external circuit breaker and the internal circuit breaker in view of a determination that the first threshold number is different from the second threshold number.

In some embodiments, the controller component 142 may generate an alert upon detecting the discrepancy between the external circuit breaker and the internal circuit breaker. The controller component 142 may also transmit the alert to a user device. The alert may include one or more messages indicating the detection of the discrepancy between the external circuit breaker and the internal circuit breaker and/or any other information about the discrepancy.

In some embodiments, the controller component 142 can include one or more components described in connection with FIG. 3 and can implement one or more methods described in connection with FIG. 4.

While various implementations are described in terms of the environment described above, the facility may be implemented in a variety of other environments including a single, monolithic computer system, as well as various other combinations of computer systems or similar devices connected in various ways. For example, the controller component 142 and/or one or more portions of the controller component 142 may be running on a node, such as nodes 111, 112, 121, 122, of the system 100 hosted by cloud 130, or may execute external to cloud 130 on a separate server device. In some implementations, the controller component 142 may include more components that what is shown that operate in conjunction with the PaaS system of network 100.

Figure 2:
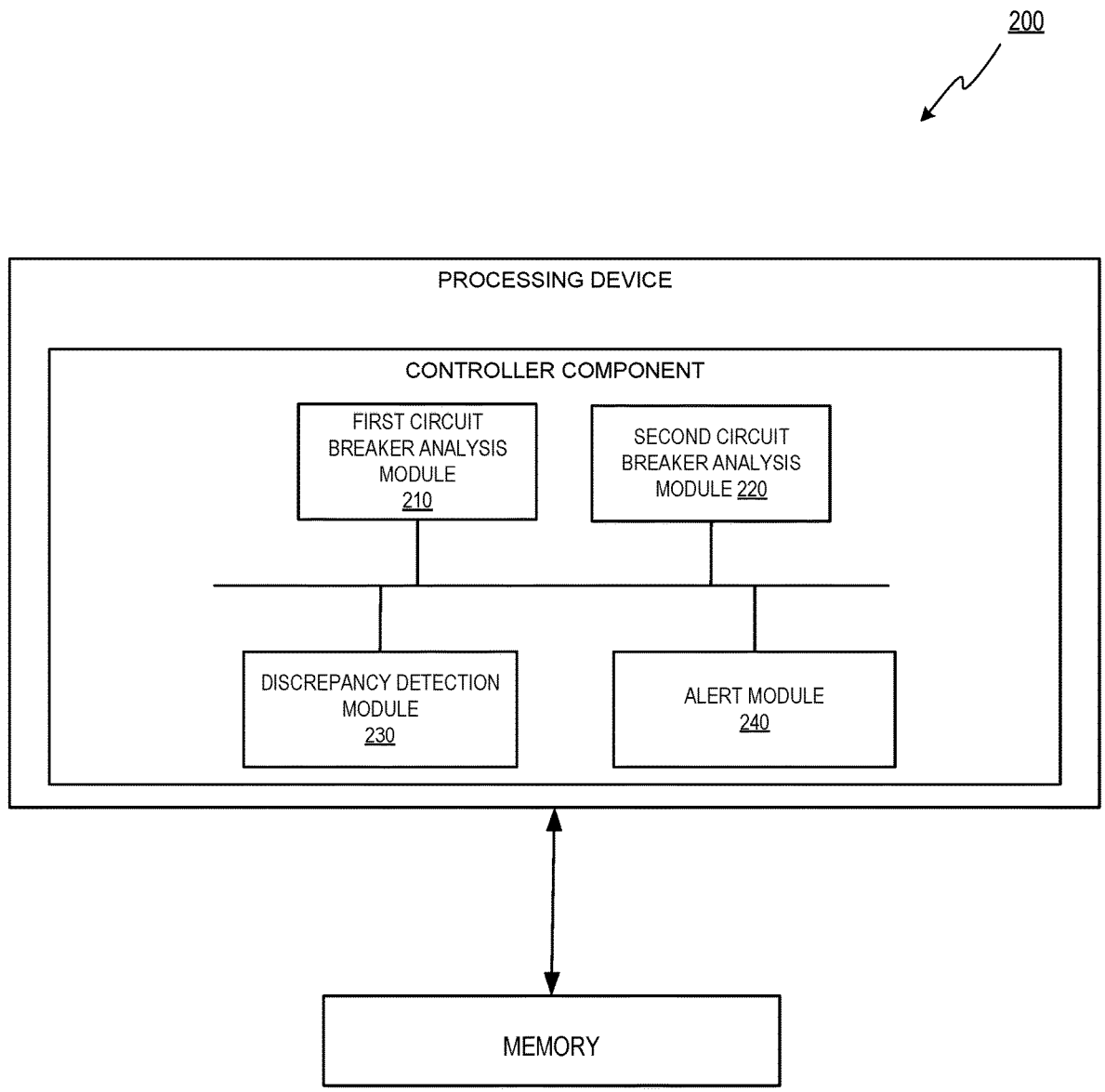
FIG. 2 depicts a block diagram of a computer system operating in accordance with one or more aspects of the present disclosure.

FIG. 2 depicts a block diagram of a computer system 200 operating in accordance with one or more aspects of the present disclosure. Computer system 200 may be the same or similar to computer system 100 and may include one or more processing devices and one or more memory devices. In the example shown, computer system 200 may include a first circuit breaker analysis module 210, a second circuit breaker analysis module 220, a discrepancy determination module 230, and an alert module 240.

The first circuit breaker analysis module 210 may analyze an external circuit breaker and/or services and may determine circuit breaking rules related to the external circuit breaker. For example, the first circuit breaker analysis module 210 may determine a first circuit breaking rule of a first circuit breaker applicable to a first application and/or service, wherein the first circuit breaker is an external circuit breaker applicable to one or more endpoints (e.g., containers, pods, VMs, nodes) of a computer system. In some embodiments, the first circuit breaker analysis module 210 may determine the first circuit breaking rule in view of one or more configuration files defining the first circuit breaker. The configuration files may be independent of source code of the first application and/or service and may be modified without changing the source code of the first application and/or service.

The first circuit breaking rule may be any rule that defines one or more event that may trigger the first circuit breaker. For example, the first circuit breaking rule may include a first threshold number of connections to the application and/or service (e.g., a maximum number of concurrent connections to the application and/or service), a first threshold number of requests (e.g., the maximum number of requests) that can be handled by a connection to the application and/or service (e.g., the maximum number of requests to be handled by the connection), etc.

The second circuit breaker analysis module 220 may analyze an internal circuit breaker applicable the application and/or services and may determine circuit breaking rules related to the internal circuit breaker. For example, the second circuit breaker analysis module 220 may determine a second circuit breaking rule of a second circuit breaker, wherein the first circuit breaker is an application-specific breaker applicable to the application and/or service. In some embodiments, the second circuit breaker analysis module 220 may determine the second circuit breaking rule in view of source code of the application and/or service.

The discrepancy detection module 230 may detect discrepancies between an external circuit breaker and an internal circuit breaker applicable to a particular application and/or service. For example, the discrepancy detection module 230 may detect a discrepancy between the first circuit breaker and the second circuit breaker (e.g., in view a difference between the first circuit breaking rule and the second circuit breaking rule).

The alert module 240 may generate an alert in response to detecting the discrepancy between the first circuit breaking rule and the second circuit breaking rule. The alert may include one or more messages indicating the discrepancy between the first circuit breaking rule and the second circuit breaking rule. The one or more messages may include text, images, and/or any other content. In some embodiments, the alert module 240 may also transmit the alert to a user device for presentation to a user (e.g., an administrator of the application/service and/or any other user related to the application/service).

Figure 3:
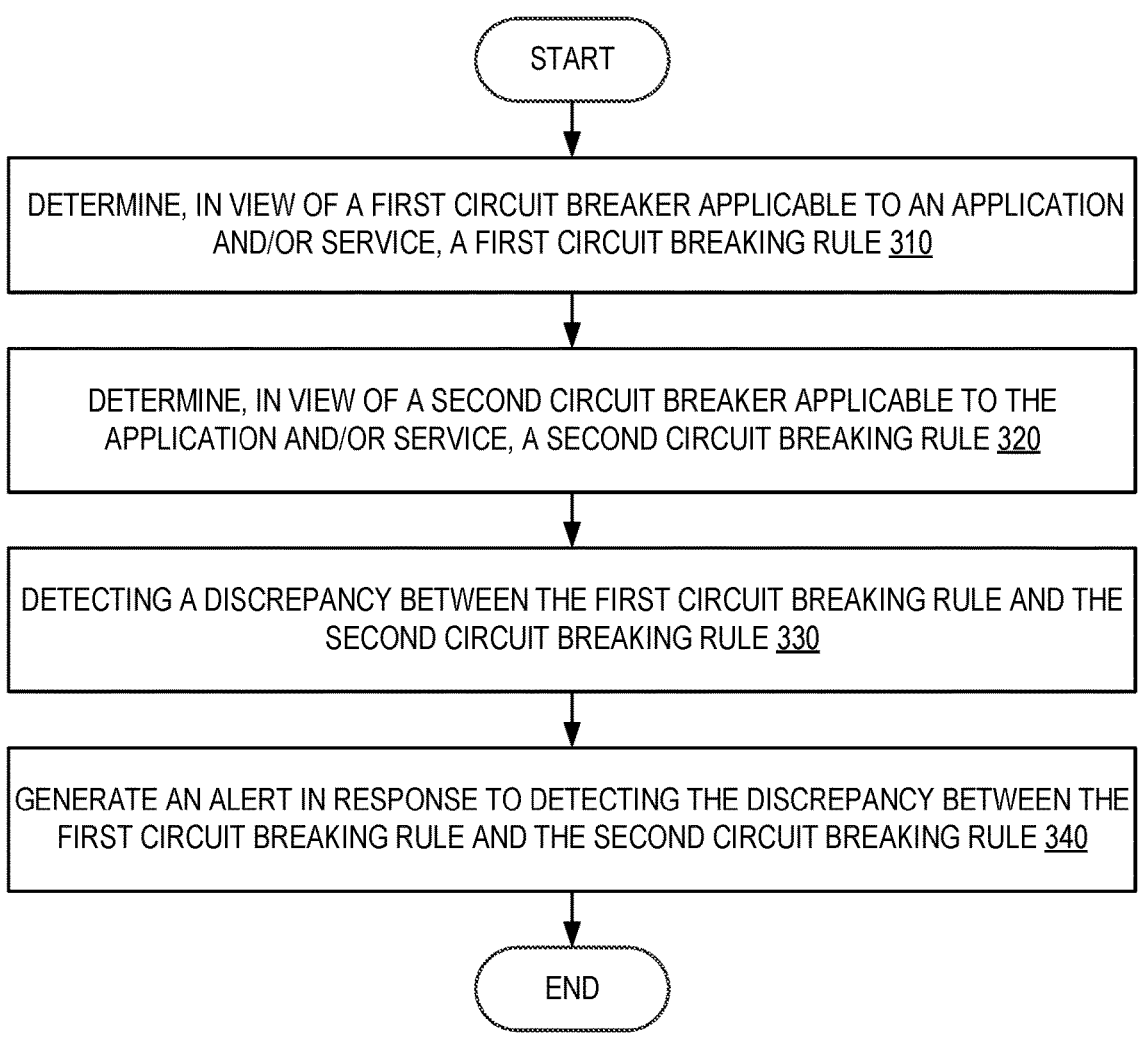
FIG. 3 is a flow diagram illustrating a method for detecting and handling discrepancies between an external circuit breaker and an internal circuit breaker applicable to an application and/or service according to some embodiments of the disclosure.

FIG. 3 is a flow diagram illustrating a method 300 for detecting discrepancies between an external circuit breaker and an internal circuit breaker applicable to an application and/or service in accordance with some embodiments of the disclosure. Method 300 can be performed by processing logic that may comprise hardware (e.g., circuitry, dedicated logic, programmable logic, microcode, etc.), software (such as instructions run on a processing device), firmware, or a combination thereof. In one implementation, method 300 is performed by a processing device (e.g. a processing device 402 of FIG. 4).

Method 300 begins at block 310 where the processing device may determine, in view of a first circuit breaker applicable to an application and/or service, a first circuit breaking rule. The first circuit breaker may be an external circuit breaker implemented by a computer system hosting the application and/or service and may be applicable to one or more endpoints of the computer system. Each of the endpoints may be and/or include one or more containers, groups of containers, nodes, etc. The one or more endpoints may include one or more endpoints that host the application and/or service (also referred to as the "first endpoint(s)"). The one or more endpoints may also include one or more endpoints that host one or more other applications and/or services (e.g., one or more second endpoints hosting a second application and/or service). The processing device may determine the first circuit breaking rule in view of one or more configurations of the endpoints (e.g., one or more configuration files). The configurations of the endpoints may be independent of source code of the application and/or service.

The first circuit breaking rule may be any rule that defines one or more event that may trigger the first circuit breaker. For example, the first circuit breaking rule may include a first threshold number of connections to the application and/or service (e.g., a maximum number of concurrent connections to the application and/or service), a first threshold number of requests (e.g., the maximum number of requests) that can be handled by a connection to the application and/or service (e.g., the maximum number of requests to be handled by the connection).

At block 320, the processing device may determine, in view of a second circuit breaker applicable to the application and/or service, a second circuit breaking rule. The second circuit breaker may be an internal circuit breaker defined by the application and/or service. As an example, the second circuit breaker may be defined by one or more portions of source code of the application and/or service. The processing device may determine the second circuit breaking rule in view of the source code of the application and/or service. As another example, the second circuit breaker may be defined by a configuration file related to the source code of the application and/or service (e.g., a configuration file referenced to in the source code). The configuration file may include the second circuit breaking rule. In such an example, the processing device may determine the second circuit breaking rule in view of the configuration file.

The second circuit breaking rule may be any rule that defines one or more event that may trigger the second circuit breaker. For example, the second circuit breaking rule may include a second threshold number of connections to the application and/or service (e.g., a maximum number of concurrent connections to the application and/or service), a second threshold number of requests (e.g., the maximum number of requests) that can be handled by a connection to the application and/or service (e.g., the maximum number of requests to be handled by the connection).

At block 330, the processing device may detect a discrepancy between the first circuit breaking rule and the second circuit breaking rule. For example, the processing device may compare the first circuit breaking rule and the second circuit breaking rule and may detect the discrepancy in response to detecting a difference between the first circuit breaking rule and the second circuit breaking rule (e.g., the first threshold number of connections to the application/service being different from the second threshold number of connections to the application/service).

At block 340, the processing device may generate an alert in response to detecting the discrepancy between the first circuit breaking rule and the second circuit breaking rule. The alert may include one or more messages indicating the discrepancy between the first circuit breaking rule and the second circuit breaking rule. The one or more messages may include text, images, and/or any other content. In some embodiments, the processing device may also transmit the alert to a user device for presentation to a user (e.g., an administrator of the application/service and/or any other user related to the application/service).

Figure 4:
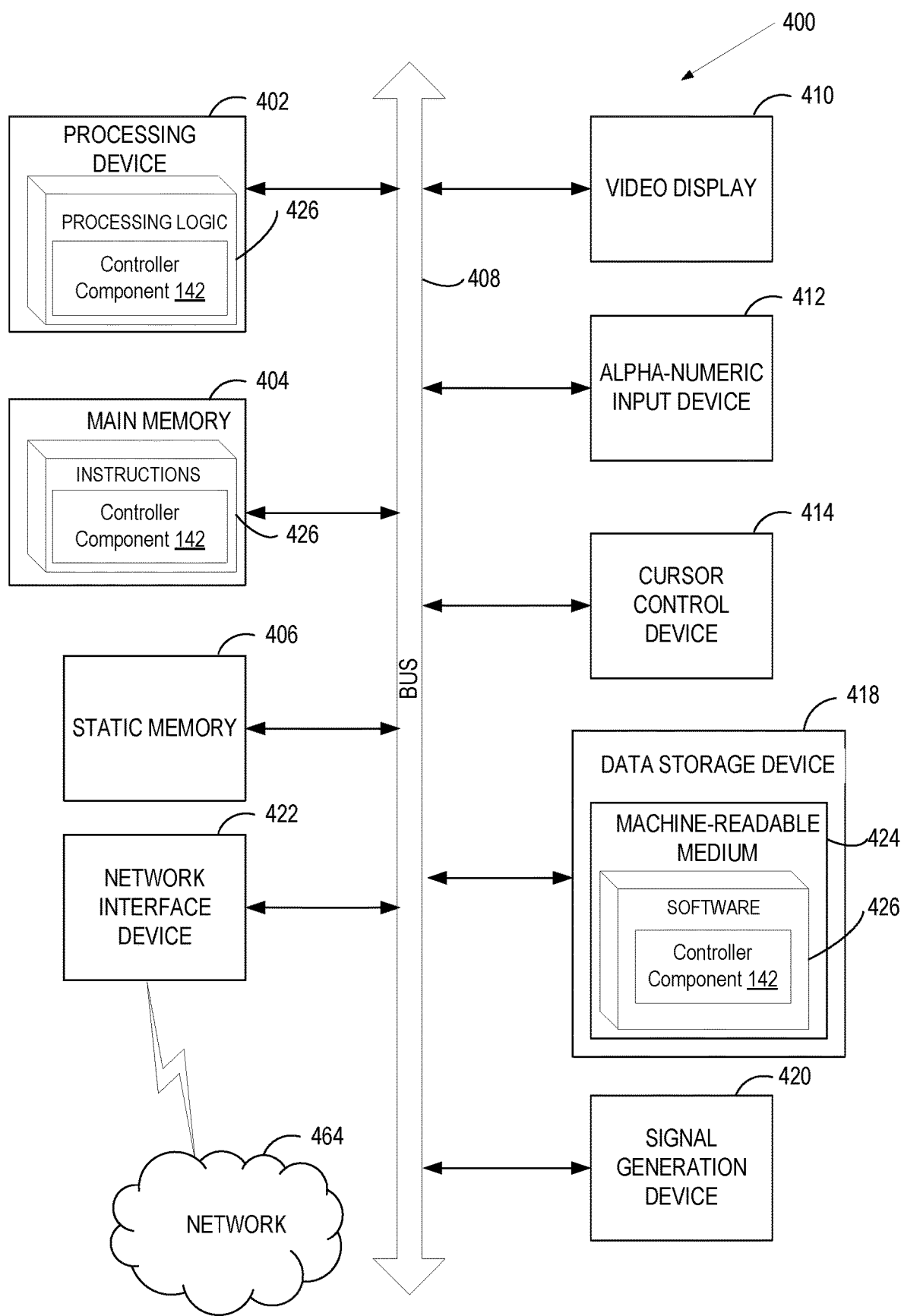
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 508.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to securing virtual machines, such as the controller component 142 as described with respect to FIG. 1, and/or a software library containing methods that call the above applications. While the machine-accessible storage medium 424 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending," "receiving," "detecting," "providing," "executing," "running," "initializing," "storing," "allocating," "determining," "associating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The terms "first," "second," "third," "fourth," etc. as used herein are meant as labels to distinguish among different elements and may not necessarily have an ordinal meaning according to their numerical designation.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   configuring, by a traffic controller component executing on a processing device of a computer system hosting a service on a plurality of endpoints, an external circuit breaker in view of a configuration file that is independent from a source code for the service, wherein the external circuit breaker is configured for an application to the service, and wherein the configuration file comprises a first circuit breaking rule that defines a first set of conditions that invoke the external circuit breaker;
   responsive to detecting that a condition of the first set of conditions defined by the first circuit breaking rule is satisfied, controlling, by the traffic controller component, traffic to the service on the plurality of endpoints;
   determining, by the traffic controller component, a second circuit breaking rule from the source code of the service, wherein the second circuit breaking rule defines a second set of conditions that invoke an internal circuit breaker that is configured for the application to the service;
   determining, by the traffic controller component whether the condition of the first set of conditions defined by the first circuit breaking rule corresponds to a respective condition of the second set of conditions defined by the second circuit breaking rule;
   responsive to determining that the condition of the first set of conditions does not correspond to the respective condition of the second set of conditions, detecting, by the traffic controller component, a discrepancy between the first circuit breaking rule and the second circuit breaking rule; and
   transmitting, by the traffic controller component, an alert indicating the detected discrepancy between the first circuit breaking rule and the second circuit breaking rule to a user device of the computer system.

2. The method of claim 1, wherein the service corresponds to at least one of a software application or a component of the software application hosted on the plurality of endpoints for the computer system.

3. The method of claim 1, wherein the first circuit breaking rule comprises a first threshold number of concurrent connections to the service, and wherein the second circuit breaking rule comprises a second threshold number of concurrent connections to the service.

4. The method of claim 1, wherein the first circuit breaking rule comprises a first threshold number of requests to be handled by a connection to a software application corresponding to the service, and wherein the second circuit breaking rule comprises a second threshold number of requests to be handled by the connection of the software application.

5. The method of claim 1, wherein each of the plurality of endpoints comprise at least one of a container or a node of the computer system.

6. The method of claim 1, further comprising:
   retrieving the configuration file associated with the external circuit breaker; and
   determining the first circuit breaking rule in view of the configuration file.

7. The method of claim 1, wherein determining the second circuit breaking rule comprises:
   retrieving an additional configuration file associated with the source code of the service; and determining the second circuit breaking rule in view of the additional configuration file.

8. A system comprising:
a memory; and
a processing device operatively coupled to the memory, the processing device to:
configure, by a traffic controller component executing on the processing device, an external circuit breaker in view of a configuration file that is independent from a source code for a service hosted on a plurality of endpoints, wherein the external circuit breaker is configured for an application to the service, and wherein the configuration file comprises a first circuit breaking rule that defines a first set of conditions that invoke the external circuit breaker;
responsive to detecting that a condition of the first set of conditions defined by the first circuit breaking rule is satisfied, control, by the traffic controller component, traffic to the service on the plurality of endpoints;
determine, by the traffic control component, a second circuit breaking rule from the source code of the service, wherein the second circuit breaking rule defines a second set of conditions that invoke an internal circuit breaker that is configured for the application to the service;
determine, by the traffic controller component, whether the condition of the first set of conditions defined by the first circuit breaking rule corresponds to a respective condition of the second set of conditions defined by the second circuit breaking rule;
responsive to determining that the conditions of the first set of conditions does not correspond to the respective condition of the second set of conditions, detect, by the traffic controller component, a discrepancy between the external circuit breaker and the internal circuit breaker; and
transmit, by the traffic controller component, an alert indicating the detected discrepancy between the external circuit breaker and the internal circuit breaker to a user device.

9. The system of claim 8, wherein to detect, in view of the first circuit breaking rule and the second circuit breaking rule, the discrepancy between the external circuit breaker and the internal circuit breaker, the processing device is to:
detect a discrepancy between the first circuit breaking rule and the second circuit breaking rule.

10. The system of claim 8, wherein the service corresponds to at least one of a software application or a component of the software application hosted on the plurality of endpoints.

11. The system of claim 8, wherein the first circuit breaking rule comprises a first threshold number of concurrent connections to the service, and wherein the second circuit breaking rule comprises a second threshold number of concurrent connections to the service.

12. The system of claim 8, wherein the plurality of endpoints host one or more additional services of a plurality of services.

13. The system of claim 8, wherein the processing device is further to:
retrieve the configuration file associated with the external circuit breaker; and
determine the first circuit breaking rule in view of the configuration file.

14. The system of claim 8, wherein, to determine the second circuit breaking rule, the processing device is further to:
retrieve an additional configuration file associated with the source code of the service; and
determine the second circuit breaking rule in view of the additional configuration file.

15. The system of claim 8, the alert comprises an indication of a discrepancy between the first circuit breaking rule and the second circuit breaking rule.

16. The system of claim 8, wherein the first circuit breaking rule comprises a first threshold number of requests to be handled by a connection to a software application corresponding to the service, and wherein the second circuit breaking rule comprises a second threshold number of requests to be handled by the connection of the software application.

17. A non-transitory machine-readable storage medium including instructions that, when accessed by a processing device, cause the processing device to:
configure, by a traffic controller component executing on the processing device, an external circuit breaker in view of a configuration file that is independent from a source code for a service hosted on a plurality of endpoints, wherein the external circuit breaker is configured for an application to the service, and wherein the configuration file comprises a first circuit breaking rule that defines a first set of conditions that invoke the external circuit breaker;
responsive to detecting that a condition of the first set of conditions defined by the first circuit breaking rule is satisfied, control, by the traffic controller component, traffic to the service on the plurality of endpoints;
determine, by the traffic controller component, a second circuit breaking rule from the a source code of the service, wherein the second circuit breaking rule defines a second set of conditions that invokes an internal circuit breaker that is configured for the application to the service;
determine, by the traffic controller component, whether the condition of the first set of conditions defined by the first circuit breaking rule corresponds to a respective condition of the second set of conditions defined by the second circuit breaking rule;
responsive to determining that the condition of the first set of conditions does not correspond to the respective condition of the second set of conditions, detect, by the traffic controller component, a discrepancy between the first circuit breaking rule and the second circuit breaking rule; and
transmitting, by the traffic controller component, an alert indicating the detected discrepancy between the first circuit breaking rule and the second circuit breaking rule to a user device.

18. The non-transitory machine-readable storage medium of claim 17, wherein the first circuit breaking rule comprises a first threshold number of concurrent connections to the service, and wherein the second circuit breaking rule comprises a second threshold number of concurrent connections to the service.

19. The non-transitory machine-readable storage medium of claim 17, wherein the first circuit breaking rule comprises a first threshold number of requests to be handled by a connection to a software application corresponding to the service, and wherein the second circuit breaking rule comprises a second threshold number of requests to be handled by the connection of the software application.

\* \* \* \* \*